United States Patent [19]

Grandhee

[11] Patent Number: 5,569,715
[45] Date of Patent: Oct. 29, 1996

[54] PROCESS FOR OBTAINING HYDROPHOBICALLY MODIFIED EMULSION POLYMERS AND POLYMERS OBTAINED THEREBY

[75] Inventor: Sunitha Grandhee, Novi, Mich.

[73] Assignee: BASF Corporation, Southfield, Mich.

[21] Appl. No.: 506,143

[22] Filed: Jul. 24, 1995

[51] Int. Cl.$^6$ ............ C08F 283/00; C08F 285/00; C08F 289/00
[52] U.S. Cl. .............. 525/7; 525/455; 525/301; 525/303; 525/305
[58] Field of Search ............ 525/301, 303, 525/305, 445, 455, 391, 7

[56] References Cited

U.S. PATENT DOCUMENTS

| | | |
|---|---|---|
| 4,070,323 | 1/1978 | Vanderhoff et al. . |
| 4,497,917 | 2/1985 | Upson et al. . |
| 4,683,269 | 7/1987 | Aksman . |
| 4,876,313 | 10/1989 | Lorah . |
| 4,898,913 | 2/1990 | Ziemelis et al. . |
| 4,916,171 | 4/1990 | Brown et al. . |
| 5,021,381 | 6/1991 | Burroway et al. ............ 502/117 |
| 5,021,469 | 6/1991 | Langerbeins et al. ............ 523/201 |
| 5,071,904 | 12/1991 | Martin et al. ............ 524/458 |
| 5,185,387 | 2/1993 | Klesse et al. . |
| 5,212,251 | 5/1993 | Lorah ............ 525/279 |
| 5,216,044 | 6/1993 | Hoshino et al. . |
| 5,266,646 | 11/1993 | Eisenhart et al. . |
| 5,306,743 | 4/1994 | Klesse et al. . |
| 5,324,781 | 6/1994 | Date et al. . |
| 5,405,879 | 8/1995 | Uemae et al. . |

OTHER PUBLICATIONS

Delgado et al., J. Polym. Sci. Polym. Chem. Ed., 27, 193–202 (1989).

*Primary Examiner*—Vasu S. Jagannathan
*Attorney, Agent, or Firm*—Anne Gerry Sabourin

[57] ABSTRACT

The present invention is directed to a process for forming a hydrophobically modified emulsion, and the modified emulsion polymer obtained thereby. The emulsion polymer is formed by first combining hydrophobic polymeric compound and $\alpha,\beta$-ethylenically unsaturated monomer, to form a mixture and subjecting the mixture to high stress techniques to form surfactant stabilized particles of the hydrophobic polymer and monomers, in the aqueous phase. The $\alpha,\beta$-ethylenically unsaturated groups within the particles are co-polymerized to form a hydrophobically modified core polymer. Additional monomers including at least one $\alpha,\beta$-ethylenically unsaturated hydrophilic monomer are then added to the core polymer and polymerized by emulsion polymerization, to form a hydrophobically modified emulsion polymer.

25 Claims, No Drawings

PROCESS FOR OBTAINING HYDROPHOBICALLY MODIFIED EMULSION POLYMERS AND POLYMERS OBTAINED THEREBY

BACKGROUND OF THE INVENTION

1. Field of the Invention

The present invention relates to a process for core-shell emulsion polymers. More specifically the invention relates to a process for hydrophobically modified core-shell emulsion polymers.

2. Background of the Invention

Emulsion polymers may be formed by either batch one step, or by two step emulsion polymerization processes. The batch process refers to combining all reactants and polymerizing in a single step. A two step emulsion polymerization refers to forming a first polymer and then polymerizing additional reactants in the presence of the first polymer to form the final emulsion polymer. The two step emulsion polymerization process may be used to form a core-shell polymer.

The core-shell polymer refers to the morphology of the final polymer particles. The core refers to the polymer formed in the first step. The shell refers to the polymer formed in a second step by polymerizing additional monomers in the presence of the polymer formed in the first step. The monomers for the core may be varied from those of the shell to provide a core having varied characteristics from the shell. Such variations include differing hardnesses by using monomers with different glass transition temperatures, as taught by Morgan et al. in Journal of Applied Polymer Science, Vol. 27, p. 2033–2042 (1982). Other variations include varying the polarity or varying molecular weights of the core and shell.

Emulsion polymers are desirable for use in coating compositions, as these provide waterborne coatings with lower volatile organic content than solvent borne coatings. Such emulsions when used in a coating provide excellent appearance and desirable rheological characteristics.

Core-shell emulsion polymers containing a hydrophobic component are highly useful when used in a coating composition. In addition to the benefits listed above for emulsion polymers, the core-shell emulsion polymers contribute to improved solvent tolerance of the coating composition. Hydrophobic core-shell polymers can be used to provide high solids waterborne coatings. The hydrophobicity is generally introduced via acrylic monomers having at least four carbon atoms in the side chain. However, the level of hydrophobicity which can be introduced by such methods is limited.

It is desirable, therefore, to provide a process for producing core-shell emulsion polymers having a high concentration of hydrophobe, and whereby a variety of hydrophobes can be introduced.

SUMMARY OF THE INVENTION

The present invention is directed to a process for forming hydrophobically modified emulsion polymers and the emulsion polymer formed thereby.

The process includes first forming a mixture of a hydrophobic polymeric compound and $\alpha,\beta$-ethylenically unsaturated monomers, surfactant and water and subjecting the mixture to high stress techniques to form droplets or particles of the mixture. The $\alpha,\beta$-ethylenically unsaturated groups within the particles are co-polymerized by a process of mini-emulsion polymerization, to form the core polymer.

Mini-emulsion refers to polymerization occurring in small droplets of the mixture, in contrast to polymerization of the micelles (aggregates of large molecules), as occurs in classical emulsion polymerization. In classical emulsion polymerization, a mixture of surfactant and water forms micelles having a particle size of between 1000 and 10,000 nm. The monomers are fed gradually into the micelles and polymerized in the micelles. In the present invention, surfactant, water, hydrophobe and monomers are combined and subjected to high stress techniques to form small droplets of the mixture having a particle size of between 50 and 500 nm. These droplets are polymerized. This technique is referred to in the application as mini-emulsion polymerization.

One or more $\alpha,\beta$-ethylenically unsaturated monomers, including hydrophilic $\alpha,\beta$-ethylenically unsaturated monomers are then added to the first emulsion polymer and co-polymerized by classical emulsion polymerization, to form the shell polymer. The hydrophobe comprises up to 50% of the core polymer and up to 30% of the final core-shell polymer.

The present invention is advantageous in that it provides a method for forming a hydrophobic core—hydrophilic shell emulsion polymer, formed by introducing a "foreign hydrophobe" into the core polymer, to achieve a level of hydrophobicity not attainable by merely varying the $\alpha,\beta$-ethylenically unsaturated monomers. By "foreign hydrophobe" is meant that the hydrophobe is separate from the monomers used to polymerize the core and shell. However, the hydrophobe becomes part of the final core-shell polymer particles and does not merely exist as separate hydrophobe particles in the emulsion polymer.

DETAILED DESCRIPTION OF THE INVENTION

The present invention is directed to a process for forming hydrophobically modified emulsion polymers including a hydrophobic core and a hydrophilic shell. The expressions "core" and "shell" are used herein based on the premise that in a first polymerization step, a hydrophobically modified core polymer is obtained and in the second polymerization step a hydrophilic shell is formed on the outside of the core.

The core-shell emulsion polymers are made by a two step emulsion polymerization process. The core is formed in the first step by mixing a hydrophobic polymeric compound and $\alpha,\beta$ ethylenically unsaturated monomers, combining the mixture with surfactant and water, subjecting the mixture to high stress techniques to form surfactant stabilized particles or droplets of the hydrophobic polymer and monomers in the aqueous phase. The particles or droplets of the hydrophobic polymer and monomer have a diameter of between 50 and 500 nm and, preferably, having an average particle size of between 100 and 300 nm. The $\alpha,\beta$ ethylenically unsaturated groups within the particles or droplets are then co-polymerized by either a batch redox or thermal semi-continuous mini-emulsion polymerization process. In a second step, a hydrophilic outer shell polymer is formed by adding to the polymer formed in the first step, a mixture of $\alpha,\beta$-ethylenically unsaturated monomers containing one or more hydrophilic monomers and surfactant, and then co-polymerizing the monomers by batch redox or thermal semi-continuous emulsion polymerization.

For purposes of the present invention, a hydrophobic polymeric compound is defined as a polymeric compound that when mixed with an organic component and water, is mostly present in the organic phase, while a separate aqueous phase is observed. The hydrophobic polymer used in the core comprises 20–75%, preferably 30–55% by weight of the mixture used to form the core polymer, with the rest of the mixture comprising the α,β ethylenically unsaturated monomers, water and surfactant. The hydrophobic polymer is present in an amount based on between 1.0 and 30.0% by weight, based on the total weight of the emulsion polymer. Preferably, the hydrophobic polymer is present in an amount between 10.0% and 20.0% by weight, based on the total weight of the emulsion polymer. The hydrophobic compound has a number average molecular weight greater than or equal to 1,000 and may be any suitable polymeric compound. The hydrophobe has an acid number of between 0 and 7 mg KOH/g.

For purposes of the present invention, suitable hydrophobic compounds include condensation polymers including polyester polymers, polyurethane polymers, alkyds and polyether polymers. Also suitable are hydrophobic addition polymers and copolymers formed by free radical addition polymerization of α,β-ethylenically unsaturated monomers. The condensation and addition polymers can also include trialkyl silyl groups or fluorine groups. The hydrophobic compound can also be any mixture of the above mentioned polymers.

Examples of suitable polyester polymers are those prepared from polyfunctional acids and polyhydric alcohols. Examples of such acids include phthalic acid, isophthalic acid, adipic acid, azeleic acid, sebacic acid, succinic acid, fumaric acid, maleic acid, and anhydrides thereof, dimethylolpropionic acid, ricinoleic acid and hydroxy acids such as 12-hydroxystearic acid. Suitable polyhydric alcohols are 1,4-butanediol, 1,6-hexanediol, neopentyl glycol, ethylene glycol, propylene glycol, diethylene glycol, dipropylene glycol, butylene glycol, glycerol, trimethylolpropane, pentaerythritol, 2,2,3,3,4,4-hexafluoro-1,5-pentanediol and sorbitol. Often additional acids such as phthalic acid, isophthalic acid, adipic acid, azeleic acid, sebacic acid, perfluoroazelaic acid and the anhydrides thereof may be added to provide desirable properties. Other acids and alcohols that may be included are the acids having between 12 and 36 carbon atoms in the alkyl portion of the molecule, particularly preferred are the dimer fatty acids. Suitable alcohols include alcohols derived from fatty alcohols. Particularly preferred are dimer fatty alcohols. Other components of polyesters can include lactones such as, ε-caprolactone and δ-butyrolactone.

A polyester containing polymerizable α,β ethylenically unsaturated groups can be obtained by reacting polyol containing α,β ethylenically unsaturated groups with polycarboxylic acid and/or anhydride. Examples of these include glyceryl monomethacrylate, allyloxy 1,2-propanediol and trimethylolpropane mono allyl ether.

The hydrophobic polyurethanes are formed by reacting a polyol with a polyisocyanate. The organic polyisocyanate can be an aliphatic polyisocyanate, including a cycloaliphatic polyisocyanate or an aromatic isocyanate. Useful polyisocyanates include ethylene diisocyanate, 1,2-diisocyanatopropane, 1,3-diisocyanatopropane, 1,4-butylene diisocyanate, lysine diisocyanate, 1,4-methylene bis (cyclohexyl isocyanate), isophorone diisocyanate, toluene diisocyanate, isocyanurates of toluene diisocyanate, diphenylmethane 4,4'-diisocyanate, isocyanurates of diphenylmethane 4,4'diisocyanate, methylenebis-4,4'-isocyanatocyclohexane, isophorone diisocyanate, isocyanurates of isophorone diisocyanate, 1,6-hexamethylene diisocyanate, isocyanurates of 1,6-hexamethylene diisocyanate, 1,4-cyclohexane diisocyanate, p-phenylene diisocyanate, triphenylmethane 4,4',4"-triisocyanate, tetramethyl xylene diisocyanate, dimethyl-metaisopropenylbenzyl isocyanate and metaxylene diisocyanate.

The polyol used to prepare the polyurethane can be polymeric such as polyester polyols, polyether polyols, or polyurethane polyols, or it can be a simple diol or triol such as 1,6-hexane diol, ethylene glycol, propylene glycol, butylene glycol, neopentyl glycol, diethylene glycol, triethylene glycol, tetraethylene glycol, glycerol, glyceryl methacrylate, trimethylol ethane, trimethylolpropane or hexanetriol. The polyol may include fluorine groups or silane groups. Examples of these include 2,2,3,3,4,4-hexafluoro-1,5-pentanediol and perfluoroazelaic acid. Polyols that may be included to provide ethylenic unsaturation include allyloxy 1,2-propanediol and trimethylolpropane monoallyl ether and glyceryl monomethacrylate. Mixtures can also be utilized.

For purposes of the present invention, polyester polyols comprising the reaction products of aliphatic, cycloaliphatic, or aromatic dicarboxylic acids and/or anhydrides and aliphatic, cycloaliphatic, or aromatic diols as described in the preceding paragraph for hydrophobic polyesters can be reacted with polyisocyanate to form the hydrophobic polyurethane. The polyol can also be an addition polymer with terminal OH groups, such as the oligomer of styrene and allyl alcohol (available commercially as RJ 100 from Monsanto Co., St. Louis, Mo.).

Two general synthetic approaches are utilized to synthesize the polyurethane resin. A polyurethane having terminal hydroxy functionality is obtained by reacting polyisocyanate and polyol with an OH:NCO equivalent ratio of greater than 1:1. In this case capping of the isocyanate occurs simultaneously with the synthesis of the polyurethane resin. Alternatively, polyurethane may be formed by reacting polyisocyanate and polyol with an OH:NCO ratio of less than 1:1. In this case, where excess isocyanate is used, the polyurethane having unreacted isocyanate functionality is then reacted with a capping agent prior to its use as a hydrophobe.

Suitable capping agents include reactive alcohols or amines. Examples of these are trimethylolpropane, ethanolamine, diethanolamine, Solketal, diols, triols, or a mixture of diols and triols. Capping agents that may be used to provide α,β-ethylenic unsaturation can be obtained by reacting the polyol and polyisocyanate with an α,β-ethylenically unsaturated monomer with at least one H atom reactive towards an isocyanate group. Examples of these include hydroxyethyl acrylate, hydroxyethyl methacrylate, hydroxypropyl acrylate, hydroxypropyl methacrylate, hydroxybutyl acrylate, hydroxybutyl methacrylate, glyceryl monomethacrylate, allyloxy 1,2-propanediol, and trimethylolpropane monoallyl ether.

An acid functional polyurethane may be obtained by including an acid-functional polyol such as dimethylol propionic acid, hydroxyethyl propionic acid, dihydroxymaleic acid, dihydroxytartaric acid, 2,6-dihydroxybenzoic acid, glycolic acid, glycine, 2-hydroxyethane sulphonic acid.

As mentioned earlier, suitable hydrophobic compounds also include alkyd polymers. The alkyd polymers are polyesters of polyhydroxyl alcohols and polycarboxylic acids chemically combined with various drying, semi-drying and nondrying oils in different proportions. Thus, for example, the alkyd resins are made from polycarboxylic acids such as phthalic acid, maleic acid, fumaric acid, isophthalic acid, succinic acid, adipic acid, azeleic acid, and sebacic acid as well as from, anhydrides of such acids, where they exist. The polyhydric alcohols which can be reacted with the polycarboxylic acid include 1,4-butanediol, 1,6-hexanediol, neopentyl glycol, ethylene glycol, diethylene glycol and 2,3-butylene glycol, glycerol, trimethylolpropane, pentaerythritol, sorbitol and mannitol.

The alkyd resins are produced by reacting the polycarboxylic acid and the polyhydric alcohol together with a drying, semi-drying or non-drying oil in proportions depending upon the properties desired. The oils are coupled into the resin molecule by esterification during the manufacturing and become an integral part of the polymer. The oil is fully saturated or predominately unsaturated. When cast into films, the fully saturated oils tend to give a plasticizing effect to the film, whereas the predominately unsaturated oils tend to crosslink and dry rapidly with oxidation to give more tough and solvent resistant films. Suitable oils include coconut oil, fish oil, linseed oil, tung oil, castor oil, cottonseed oil, safflower oil, soybean oil, and tall oil. Various proportions of the polycarboxylic acid, polyhydric alcohol and oil are used to obtain alkyd resins of various properties as is well known in the art.

Examples of polyether polyols are polyalkylene ether polyols which include poly(oxytetraethylene) glycols, poly(oxy-1,2-propylene) glycols and poly(oxy-1,2-butylene glycols.

Also useful are polyether polyols formed from oxyalkylation of various polyols, for example, glycols such as ethylene glycol, 1,6-hexanediol, Bisphenol A and the like, or other higher polyols, such as trimethylolpropane, pentaerythritol and the like. Polyols of higher functionality which can be utilized as indicated can be made, for instance, by oxyalkylation of compounds such as sorbitol or sucrose. One commonly utilized oxyalkylation method is to react a polyol with an alkylene oxide, for example, ethylene or propylene oxide, in the presence of an acidic or basic catalyst.

As was mentioned above, the addition polymers which are examples of suitable substantially hydrophobic polymers include those obtained by either polymerization of α,β-ethylenically unsaturated monomers or olefinic polymerization. The polymers obtained by polymerization of α,β-ethylenically unsaturated monomers include but are not limited to polymers and copolymers obtained from:

polymerizable amide compounds including acrylamide, N-(1,1-Dimethyl-3-oxobutyl)-acrylamide, N-alkoxy amides such as methylolamides; N-alkoxy acrylamides such as n-butoxy acrylamide; N-aminoalkyl acrylamides or methacrylamides such as aminomethylacrylamide, 1-aminoethyl-2-acrylamide, 1-aminopropyl-2-acrylamide, 1-aminopropyl-2-methacrylamide, N-1-(N-butylamino)propyl-(3)-acrylamide and 1-aminohexyl-(6)acrylamide and 1-(N,N-dimethylamino)-ethyl-(2)-methacrylamide, 1-(N,N, dimetnylamino)-propyl-(3)-acrylamide and 1-(N,N-dimethylamino)-hexyl-(6)-methacrylamide;

polymerizable nitriles such as acrylonitrile and methacrylonitrile;

polyalkylene glycol acrylates and methacrylates such polyethylene glycol substituted acrylate and methacrylate;

alkyl acrylates or alkyl methacrylates such as methyl acrylate, methyl methacrylate, ethyl acrylate, ethyl methacrylate, n-butyl acrylate, n-butyl methacrylate, 2-ethylhexyl acrylate, cyclohexyl methacrylate, 2-ethylhexyl methacrylate, isobornyl methacrylate, stearyl methacrylate, sulfoethyl methacrylate and lauryl methacrylate;

polymerizable aromatic compounds including styrene, α-methyl styrene, vinyl toluene, t-butyl styrene; .

α-olefin compounds such as ethylene, propylene;

vinyl compounds such as vinyl acetate, vinyl propionate, vinyl ethers, vinyl and vinylidene halides, diene compounds such as butadiene and isoprene.

Other suitable hydrophobic monomers include those with fluorine or silicon atoms. Examples of these include 1H, 1H, 5H-octafluoropentyl acrylate, and trimethylsiloxyethyl acrylate.

Other suitable hydrophobic polymers include polyalkylene homopolymers, polyalkylene copolymers or polyalkylene block copolymers. Such compounds are polymerized from olefins selected from the group consisting of ethylene, propylene, butylene, and mixtures thereof. An example is an (ethylene/butylene) polymer having terminal hydroxy functionality, available commercially from Shell Chemical Company, Houston Texas, and sold under the trademark Kraton®.

The hydrophobic polymer may contain reactive functionality to react with functional groups on the core and/or shell monomers during polymerization. Alternatively, a reactive functionality on the hydrophobe may react with the core polymer and/or shell polymer(s) after polymerization. Such functionalities include residual ethylenic unsaturation or reactive groups, such as hydroxyl, carboxyl, amino, carbamate, carbonate, epoxy, carbodiimide or urea groups, and any other suitable functional group not enumerated above.

The hydrophobic polymer comprises of up to 50% of, and the α,β-ethylenically unsaturated monomers comprise between 99.0 and 50.0% of the total weight of monomers and hydrophobe in the core. The hydrophobic polymer is present in an amount up to 30.0 percent by weight, based on the total weight of the emulsion polymer. Preferably, the hydrophobic compound is present in an amount between 1.0 and 30.0 percent by weight, and most preferably between 5.0 and 20.0 percent by weight, based on total weight of the emulsion polymer.

Suitable monomers used in the first stage, to polymerize the core polymer are α,β-ethylenically unsaturated monomers including the monomers as described earlier for the synthesis of the hydrophobic addition polymer.

Monomers having reactive functional groups may also be included in the core. Examples of these include but are not limited to:

carboxyl containing monomers such as acrylic acid, methacrylic acid, crotonic acid, itaconic acid, maleic acid, fumaric acid, 2-acryloxymethoxy-O-phthalic acid, 2-acryloxy-1-methylethoxy-O-hexahydrophthalic acid; hydroxyl containing monomers such as 2-hydroxyethyl acrylate, 2-hydroxyethyl methacrylate, hydroxypropyl methacrylate, hydroxybutyl acrylate, hydroxybutyl methacrylate, allyl alcohol, and methallyl alcohol; epoxy functional monomers such as glycidyl methacrylate; nitrogen containing alkyl acrylates or methacrylates such as aminomethyl, aminoethyl, aminopropyl, aminobutyl and aminohexyl acrylates and methacrylates, dimethylaminoethyl acrylate, dimethylaminoethyl methacrylate; N-alkoxymethylacrylamide monomers including N-(methoxymethyl)acrylamide, N-(propoxymethyl)acrylamide, N-isopropoxymethyl-acrylamide, N-(butoxymethyl)acrylamide;, isocyanate functional monomers such as dimethyl-meta-isopropenylbenzyl isocyanate; sulfonic acid functional monomers such as 2-acrylamido-2-methylpropane sulfonic acid, alkoxy alkyl acrylates and methacrylates, carbonate functional monomers such as the carbonate of glycidyl methacrylate, and carbamate functional monomers such as 2-carbamate ethyl methacrylate and 2-carbamate propyl methacrylate.

Optionally, the core or shell, or both can be crosslinked. This crosslinking can be achieved by including crosslinking monomers such as 1,6-hexane diacrylate, divinyl benzene, allyl methacrylate, ethylene glycol dimethacrylate, trimethylolpropane triacrylate.

The mixture of hydrophobic polymer and monomers may contain surfactant in an amount between 1.0% and 5.0% by weight, based on the total solids weight of the core. The surfactant used in the high stress technique serves to achieve the requisite dispersion stability of the droplets formed by the technique. The surfactant serves to prevent the emulsified droplets from agglomerating to form larger particles.

The same surfactants or dispersants which can be utilized during conventional emulsion polymerization are also suitable for this high stress technique. Examples of suitable surfactants include the dimethylethanolamine salt of dodecylbenzene sulfonic acid, sodium dioctylsulfosuccinate, ethoxylated nonylphenol and sodium dodecyl benzene sulfonate. The surfactant can be anionic, cationic, nonionic or amphoteric, or a mixture of these. Other materials well known to those skilled in the art are also suitable.

Optionally, hydrophobic solvents such as cetyl alcohol, or hexadecane can be used in the pre-emulsion mixture.

In a preferred embodiment, the high stress technique used to form the particles is a MICROFLUIDIZER® emulsifier, which is available from Microfluidics Corporation in Newton, Mass. The MICROFLUIDIZER® high pressure impingement emulsifier is patented in U.S. Pat. No. 4,533,254. The device consists of a high pressure (up to 25,000 psi) pump and an interaction chamber where the emulsification takes place. Generally, the reaction mixture is passed through the emulsifier once at a pressure between 5,000 and 15,000 psi. Multiple passes can result in smaller average particle size and a narrower range for the particle size distribution.

Alternative modes of applying stress to the pre-emulsification mixture can be utilized so long as sufficient stress is applied to achieve the requisite particle size distribution. For example, one alternative manner of applying stress would be the use of ultrasonic energy. For purposes of the present invention, the droplet or particle size is preferably between 100 nm and 300 nm. After polymerization, less than 20% of the polymer droplets or particles have a mean diameter greater than 200 nm.

The $\alpha,\beta$-ethylenically unsaturated groups within the particles are polymerized by either a batch redox or thermal semi-continuous emulsion polymerization process. Where the polymer is intended for use in coating compositions, polymerization is preferably by semi-continuous emulsion polymerization.

Suitable initiators for the reaction include water soluble initiators and water insoluble initiators. Examples of water soluble initiators include ammonium peroxydisulfate, potassium peroxy-disulfate, sodium metabisulfite and hydrogen peroxide. Water insoluble initiators include t-butyl hydroperoxide, dilauryl peroxide, t-butyl perbenzoate and 2,2'-azobis (isobutyronitrile). Preferably redox initiators include ammonium peroxydisulfate and sodium metabisulfite with ferrous ammonium sulfate.

Suitable $\alpha,\beta$-ethylenically unsaturated monomers used to form the shell polymer in the second polymerization step are as set forth above in the description of monomers used to synthesize the hydrophobic addition polymer and core polymer, and the monomers having reactive functionality used to synthesize the core polymer. The shell must also include at least one hydrophilic $\alpha,\beta$-ethylenically unsaturated monomer. Hydrophilic monomers include those having a functionality selected from the group consisting of sulfonic acid groups, such as 2-acrylamido-2-methylpropane sulfonic acid; monomers having carboxyl groups such as acrylic acid, methacrylic acid, crotonic acid, itaconic acid, maleic acid, fumaric acid, 2-acryloxymethoxy-O-phthalic acid, 2-acryloxy-1-methylethoxy-O-hexahydrophthalic acid; monomers having acrylamide groups such as methylolamides, n-butoxy acrylamide; N-alkoxymethylacrylamides, N-aminoalkyl acrylamides, or methacrylamides, and mixtures thereof. The hydrophilic monomers include, polyalkylene glycol acrylates and methacrylates, alkoxy alkyl acrylates and methacrylates, polyether acrylates and mixtures thereof.

Monomers with co-reactive functionalities can be included in the core, the shell, or both. For example, the core may include a reactive functional group and the shell may include a functional group that is reactive toward the core functional group. There are many pairs of functional groups that can be employed for this purpose. For example, when one functionality is an isocyanate group, the other can be a group with an active hydrogen, such as an hydroxyl group or a primary or secondary amino group. Alternatively, when one group is an acid or anhydride, the other can be an epoxy or hydroxyl group. When one group is an epoxy group, the other can be a hydroxy, phenol, or a primary or secondary amino group. When one group is an n-alkoxy methyl acrylamide, the other can be a hydroxyl group. When one group is primary or secondary carbamate, the other can be an alkoxy methyl amino group or n-alkoxy methyl acrylamide. Where one functional group is carbodiimide, the other can be an acid functionality. Where a functional group is a linear or cyclic carbonate, the other can be a primary or secondary amine.

The practitioner will readily recognize that many combinations of groups will serve the purpose of reacting together the core and shell polymers to form a grafted polymer. While reaction conditions might vary, such conditions would be readily apparent to the skilled artisan from experience or straightforward testing. It may be useful to employ catalysts such as are known in the art, as for example to use tin catalyst in reacting isocyanate groups with alcohol groups or to use triphenyl phosphine or amines to catalyze reaction of epoxy groups with carboxylic acid groups.

The ratio of the core and shell may be varied depending on the polymer characteristics desired. The core, including hydrophobe and core monomers, can comprise between 25% and 75% of the total weight of the core-shell polymer. The shell monomers comprise the remainder of the total monomers used to form the core-shell polymer. The ratio the core weight to the shell weight ranges from 25:75 to 75:25, respectively.

The type of emulsion polymerization is dependent on the future use for the emulsion polymer. When the emulsion polymer is to be used for coating compositions, a semi-continuous thermal emulsion polymerization process is preferred, as the batch redox process results in the production of salts which are undesirable in coating compositions.

The invention is illustrated in the following non-limiting examples.

EXAMPLES

Example 1

Preparation of Hydrophobic Polyester

| Ingredient | Amount (% by Weight) |
|---|---|
| Dimer Fatty Acid[1] | 45.12 |
| Isopropyl Alcohol | 12.95 |
| 1,6-hexanediol | 24.07 |
| Toluene | 1.83 |
| Methylpropyl ketone | 16.03 |
| Total | 100.00 |

[1]Sold under the trademark, Pripol 1009, from Unichema International, Chicago, Illinois.

The dimer fatty acid and 1,6-hexane diol were added to a reactor, under nitrogen blanket. Isopropyl alcohol was added and the mixture was heated to a temperature of about 200° F., with continuous mixing. Toluene was used to flush the pump and/or loading line. The column overhead was set to 200° F. Heating was continued until a temperature of 280° F. was reached. Five hours after the 280° F. temperature was reached, the column overhead temperature was reset to 215° C. and left at this setting for the rest of the process. Toluene was allowed to return to the reactor until the temperature was 310° F. At 310° F., return of the toluene was stopped. The batch was heated, until 420° F. was reached, and at 420° F., sampling was begun to determine the acid number. The reaction was allowed to continue until an acid number of between 3.5–4.2 was reached. The resin was then cooled and solids were adjusted with the addition of methyl propyl ketone.

Example 2

Preparation of Polyurethane Resin

| Ingredient | Amount (Wt. %) |
|---|---|
| Polyester resin from Ex. 1 | 39.62 |
| Neopentyl glycol | 4.16 |
| Allyloxy 1,2-propanediol | 1.66 |
| Methyl propyl ketone | 9.0 |
| N-methyl-2-pyrrolidinone | 10.23 |
| Tetramethyl xylene diisocyanate | 26.6 |
| Dibutyl tin dilaurate | 0.07 |
| Methyl propyl ketone | 1.10 |
| Trimethylolpropane | 7.56 |
| Total | 100.00 |

The polyester resin, neopentyl glycol, allyloxy propane 1,2-diol, methyl propyl ketone and N-methyl-2-pyrrolidinone and tetramethyl-1,3,-xylene diisocyanate were charged to a reactor and heated to reflux under nitrogen blanket. After 2 hours, dibutyl tin dilaurate was added to the reactor. The reaction was then continued at 90° C., until an isocyanate number of 0.75 was reached. The remaining isocyanate was reacted with trimethylolpropane and the reaction was continued until the NCO number dropped to zero. Then the reaction was cooled.

The polyurethane had a non-volatile content of 80%, and a weight average molecular weight of 12,000.

Example 3

Preparation of Hydrophobically Modified Emulsion Polymers

Procedure:

All ingredients were included in the amounts shown in Table 1, below. Amounts in Table 1 are given in percent by weight, based on total emulsion composition weight. Deionized water was heated in a 5 liter kettle to 82° C. The hydrophobe and core monomers were mixed with deionized water and surfactant, followed by thorough mixing. This mixture was passed through a microfluidizer at 8000 psi to form particles, resulting in the production of a pre-emulsion polyurethane-monomer mixture.

An initiator solution of ammonium persulfate and deionized water was prepared as indicated. The initiator solution and monomer-polyurethane mixture were added over a period of 1 hour at a temperature of between 80° and 85° C., to form the core polymer.

A second monomer mixture of shell monomers was formed by combining the monomers and surfactant, with mixing. This mixture was added to the core polymer over a period of 2 hours at temperatures of between 80°–82° C. After the addition of the shell monomers the reaction was held for two hours. Then the emulsion was cooled and filtered.

TABLE 1

Composition of Various Samples of Hydrophobically Modified Emulsion Polymers

| Ingredient | Sample 1 | 2 | 3 | 4 | 5 |
|---|---|---|---|---|---|
| Deionized Water | 24.0 | 24.0 | 21.16 | 21.99 | 10.94 |
| Deionized Water | 3.0 | 3.0 | 3.0 | 3.0 | 3.0 |
| Initiator | 0.054 | 0.054 | 0.054 | 0.054 | 0.054 |
| HYDROPHOBE | | | | | |
| Polyurethane Acid No. = 0[1] | 11.04 | — | 11.25 | 11.11 | 11.11 |
| HPVM 1201[2] | — | 9.0 | — | — | — |
| CORE MONOMERS | | | | | |
| Methyl Methacrylate | 5.40 | 5.40 | 4.27 | 0.90 | 9.9 |
| Ethylene glycol dimethacrylate | — | — | 1.127 | — | — |
| Butyl Acrylate | 4.05 | 4.05 | — | 0.68 | 7.42 |
| Hydroxy Ethyl Methacrylate | 1.35 | 1.35 | 1.35 | 0.23 | 2.47 |
| Butyl Methacrylate | 2.70 | 2.70 | 2.70 | 0.45 | 4.95 |
| Deionized Water | 22.86 | 24.9 | 25.17 | 22.86 | 35.81 |
| Anionic Surfactant (Abex)[3] | 3.0 | 3.0 | 3.0 | 3.0 | 4.5 |
| SHELL MONOMERS | | | | | |
| Methyl Methacrylate | 9.0 | 9.0 | 7.42 | 15.01 | 4.5 |
| Butyl Acrylate | 6.75 | 6.75 | 6.75 | 10.58 | 3.375 |
| Hydroxy Ethyl Methacrylate | 2.25 | 2.25 | 2.25 | 3.53 | 1.125 |
| Butyl Methacrylate | 3.71 | 3.71 | 3.71 | 5.82 | 1.86 |
| Methacrylic Acid | 0.79 | 0.79 | 2.37 | 0.79 | 0.79 |
| Nonionic Surfactant[4] | 0.10 | 0.10 | 0.2 | — | — |
| % Non-volatile | 45.9 | 46.03 | 47.65 | — | 45.96 |

[1]As prepared in Example 2
[2]Poly(ethylene/butylene) polymer containing a terminal aliphatic primary hydroxyl group, available from Shell Chemical Company, Houston, Texas.
[3]Abex EP-110 anionic surfactant from Rhone Poulenc, Cranberry, New Jersey 08512.
[4]Igepal CO-850 nonionic surfactant from Rhone Poulenc, Cranberry, New Jersey 08512.

I claim:

1. Process for emulsion polymerization of hydrophobically modified emulsion polymers comprising the steps of
   A. forming a hydrophobically modified core polymer by
      i) forming a mixture of hydrophobic polymer, $\alpha,\beta$-ethylenically unsaturated monomers, surfactant and water,
      ii) subjecting the mixture to high stress techniques, wherein the stress exerted on the mixture is sufficient to form surfactant stabilized particles of the hydrophobic polymer and monomers, having an average particle size between 100 and 300 nm, in the aqueous phase,
      iii) co-polymerizing the $\alpha,\beta$-ethylenically unsaturated groups within the particles to form a hydrophobically modified core polymer, and
   B. polymerizing a shell to form a core-shell polymer by adding to the polymer formed in step iii) $\alpha,\beta$-ethylenically unsaturated monomers including at least one hydrophilic $\alpha,\beta$-ethylenically unsaturated monomer, and co-polymerizing the monomers to form a hydrophilic shell polymer,
wherein the resultant polymer is a hydrophobically modified core-shell emulsion polymer.

2. A process as defined in claim 1, wherein the hydrophobic polymer used in the core is selected from the group consisting of hydrophobic condensation polymers and copolymers, and hydrophobic addition polymers and copolymers.

3. A process as defined in claim 1, wherein the hydrophobic polymer used in the core is a condensation polymer selected from the group consisting of polyesters, polyurethanes, alkyds and polyethers.

4. A process as defined in claim 1, wherein the hydrophobic polymer used in the core is an addition polymer selected from the group consisting of polymers and copolymers of ethylene, propylene, butylene and mixtures thereof.

5. A process as defined in claim 1, wherein the hydrophobic polymer includes reactive functionality selected from the group consisting of residual $\alpha,\beta$-ethylenic unsaturation, reactive groups isocyanate, n-alkoxy methyl acrylamides, carboxyl, epoxy, carbamate, carbodiimide, carbonate, hydroxy, phenoxy, amino, and alkoxy methyl amino groups and mixtures thereof.

6. A process as defined in claim 1, wherein the hydrophobic polymer is present in an amount up to 30% by weight based on the total emulsion polymer weight.

7. A process as defined in claim 1, wherein the hydrophobic polymer introduced into the emulsion particles has an acid number of between 0 and 7 mg KOH/g.

8. A process as defined in claim 1, wherein $\alpha,\beta$-ethylenically unsaturated monomers are present in an amount between 99.0 and 50.0% by weight and the hydrophobic polymer is present in an amount between 1.0 and 50% by weight, based on the weight of hydrophobic polymer and monomer used in the mixture formed in step a).

9. A process as defined in claim 1, wherein the hydrophilic monomers used in the shell include $\alpha,\beta$-ethylenically unsaturated monomers having a functionality selected from the group consisting of sulfonic acid, carboxylic acid, acrylamide, polyether, alkoxy alkyl and polyalkylene glycol groups and mixtures thereof.

10. A process as defined in claim 1, wherein the monomers used in step a) and the monomers used in step d) contain functional groups selected from the group consisting of isocyanate, n-alkoxy methyl acrylamides, carboxyl, epoxy, carbamate, carbodiimide, carbonate, hydroxy, phenoxy, amino, urea and alkoxy methyl amino groups and mixtures thereof.

11. A process as defined in claim 1, wherein the core includes monomers selected from the group consisting of 1,6-hexane diacrylate, divinyl benzene, allyl methacrylate, ethylene glycol dimethacrylate, trimethylolpropane triacrylate and mixtures thereof.

12. A process as defined in claim 1, wherein the shell includes monomers selected from the group consisting of 1,6-hexane diacrylate, divinyl benzene, allyl methacrylate, ethylene glycol dimethacrylate, trimethylolpropane triacrylate and mixtures thereof.

13. A process as defined in claim 1, wherein the weight ratio of the core to the shell is between 25:75 and 75:25, respectively.

14. A process as defined in claim 1, wherein the core is polymerized by a batch redox polymerization process.

15. A process as defined in claim 14, wherein the shell is polymerized by a batch redox emulsion polymerization process.

16. A process as defined in claim 14, wherein the shell is polymerized by a semi-continuous thermal emulsion polymerization process.

17. A process as defined in claim 1, wherein the core is polymerized by a semi-continuous thermal emulsion polymerization process.

18. A process as defined in claim 17, wherein the shell is polymerized by batch redox emulsion polymerization process.

19. A process as defined in claim 17, wherein step d) is accomplished by a semi-continuous thermal emulsion polymerization process.

20. A hydrophobically modified emulsion polymer prepared according to the process of claim 1.

21. The process according to claim 1, wherein the core is polymerized by mini-emulsion polymerization and the shell is polymerized by classical emulsion polymerization.

22. The process according to claim 1, wherein the hydrophobic polymer used in the core contains no reactive functionality.

23. A hydrophobically modified emulsion polymer prepared by a process comprising the steps of
   A. forming a hydrophobically modified core polymer by
      i) forming a mixture of hydrophobic polymer, $\alpha,\beta$-ethylenically unsaturated monomers, surfactant and water,
      ii) subjecting the mixture to high stress techniques, wherein the stress exerted on the mixture is sufficient to form surfactant stabilized particles of the hydrophobic polymer and monomers, having an average particle size between 100 and 300 nm, in the aqueous phase,
      iii) co-polymerizing the $\alpha,\beta$-ethylenically unsaturated groups within the particles to form a hydrophobically modified core polymer, and
   B. polymerizing a shell to form a core-shell polymer by adding to the polymer formed in step iii) $\alpha,\beta$-ethylenically unsaturated monomers including at least one hydrophilic $\alpha,\beta$-ethylenically unsaturated monomer, and emulsion polymerizing the monomers to form a hydrophilic shell polymer,
wherein the resultant polymer is a hydrophobically modified core-shell emulsion polymer.

24. The emulsion polymer according to claim 23, wherein the core is polymerized by mini-emulsion polymerization and the shell is polymerized by classical emulsion polymerization.

25. The emulsion polymer according to claim 23, wherein the hydrophobic polymer used in the core contains no reactive functionality.

* * * * *